United States Patent [19]

Shtipelman

[11] Patent Number: 5,220,222
[45] Date of Patent: Jun. 15, 1993

[54] MAGNETIC BUSHINGS FOR AN OPTICAL ACCESS ACTUATOR

[75] Inventor: Boris A. Shtipelman, Rochester, N.Y.

[73] Assignee: Eastman Kodak Company, Rochester, N.Y.

[21] Appl. No.: 811,867

[22] Filed: Dec. 23, 1991

[51] Int. Cl.$^5$ .......................... H02K 7/09; H02K 41/02
[52] U.S. Cl. ...................................... 310/12; 310/90.5
[58] Field of Search ...................... 310/12, 67 R, 90.5; 359/877, 881

[56] References Cited

U.S. PATENT DOCUMENTS

| | | | |
|---|---|---|---|
| 3,888,553 | 6/1975 | Wehde | 310/90.5 |
| 3,890,019 | 6/1975 | Boden et al. | 308/10 |
| 3,894,276 | 7/1975 | Janssen | 318/135 |
| 4,245,869 | 1/1981 | Scheffer et al. | 310/90.5 |
| 4,344,022 | 8/1982 | von der Heide | 310/12 |
| 4,387,935 | 6/1983 | Studer | 310/90.5 |
| 4,504,935 | 3/1985 | Jansen | 369/32 |
| 4,561,081 | 12/1985 | Janssen | 369/45 |
| 4,613,962 | 9/1986 | Inoue et al. | 369/44 |
| 4,644,205 | 2/1987 | Sudo et al. | 310/90.5 |
| 4,841,204 | 6/1989 | Studer | 310/90.5 |
| 4,857,781 | 8/1989 | Shih | 310/12 |
| 4,900,962 | 2/1990 | Hockney et al. | 310/90.5 |
| 4,943,747 | 7/1990 | Lee | 310/67 R |
| 4,983,869 | 1/1991 | Vaidya et al. | 310/90.5 |
| 4,983,870 | 1/1991 | McSparran | 310/90.5 |
| 5,057,733 | 10/1991 | Sonoda et al. | 310/67 R |
| 5,111,102 | 5/1992 | Meeks | 310/905 |

Primary Examiner—Steven L. Stephan
Assistant Examiner—C. LaBalle
Attorney, Agent, or Firm—William W. Holloway

[57] ABSTRACT

A magnetic field bushing has a movable member and stationary rod. The stationary rod has high permeability strips of magnetic material forming a portion of the surface. The stationary rod further includes at least two sets of coils, the magnetic field resulting from application of a current to each coil being coupled to a strip. The movable member is configured to encircle substantially the stationary rod. The movable member has regions of high permeability magnetic material which are positioned on the movable member to complete a magnetic circuit with related magnetic strips. The magnetic circuits are completed through air gaps between the movable member regions and the stationary rod strips. The magnetic field in the air gaps results in a force between the movable member regions and the stationary rod strips. Forces are generated between the movable member and the stationary rod, the forces being selected to prevent contact between the movable member and the stationary rod. By using sensors which provide a signal determined by the distance between the movable and the stationary rod to control the current in the coils, the distance the members can be maintained even in the presence of external forces. This magnetic bushing has particular application to the actuator or read/write head of an optical storage system.

16 Claims, 5 Drawing Sheets

FIG. 12

MAGNETIC BUSHINGS FOR AN OPTICAL ACCESS ACTUATOR

BACKGROUND OF THE INVENTION

1. Field of Invention

This invention relates generally to the actuator which includes the read/write head in an optical storage system and, more particularly, to the mechanism for supporting the actuator relative to the rest of the optical storage system. The actuator of the optical storage system must be capable of smooth movement, i.e., without sticking, and precise positioning.

2. Description of the Related Art

Figures 1A, 1B:
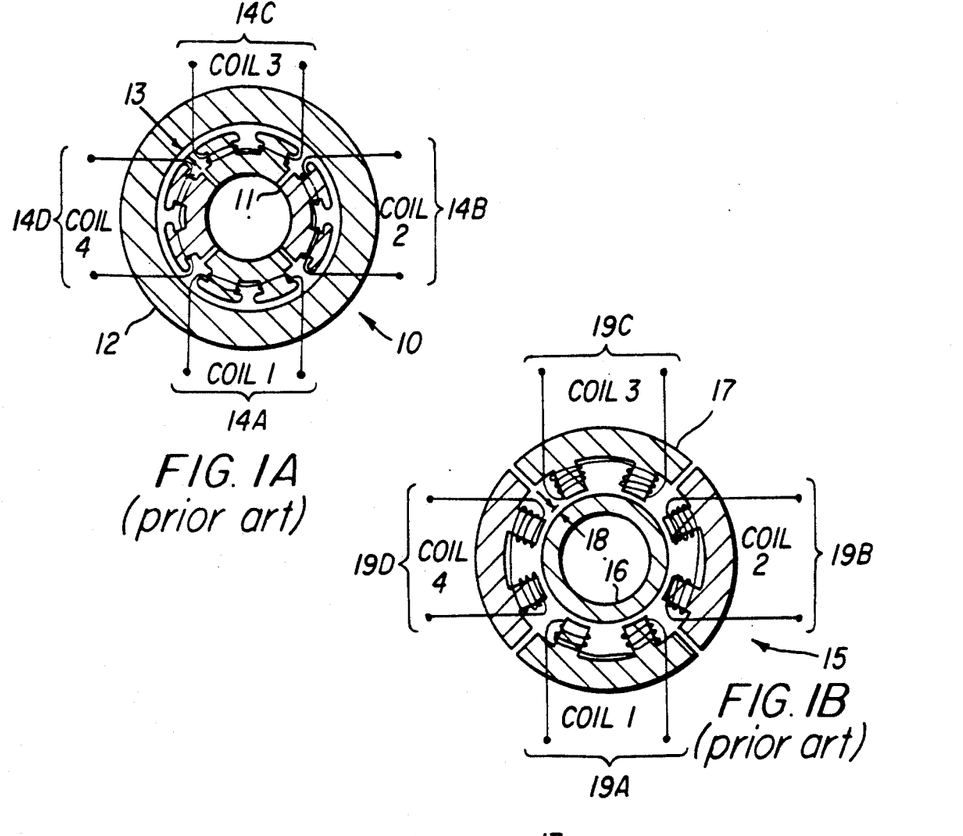
FIG. 1A and FIG. 1B are cross-sectional diagrams of commercially available magnetic bearings.

The requirements for the coupling of the actuator to the remainder of an optical storage and retrieval system suggest characteristics which have been found for magnetic field bushings. Magnetic bushings are commercially available and facilitate rotational movement. Typically, the bushings support rotating shafts. In FIG. 1A and FIG. 1B, commercially available magnetic field bushing designs are illustrated. In FIG. 1A, magnetic bushing 10 has a stator 11 which is surrounded by the rotor 12. The stator 11 has structures upon which conducting wire has been wound. The windings are arranged into coil 1, coil 2, coil 3, and coil 4. The rotor 12 and regions of the stator 11 associated with each coil are fabricated from a high permeability magnetic material. Associated with each coil is a plurality of air gaps 13 configured so that coil 1, coil 2, coil 3, and coil 4 are portions of electromagnet 14A, electromagnet 14B, electromagnet 14C, and electromagnet 14D, respectively, each electromagnet exerting a force on the rotor 12 determined by the number of windings in the associated coils and the current through the coils. In FIG. 1B, magnetic bushing 15 is configured so that the position of the stator 17 and the rotor 16 are reversed. The stator 17 has structure upon which electrical conductors are wound to form coil 1, coil 2, coil 3, and coil 4. The coils 1, 2, 3, and 4 along with the materials from which the stator regions and the rotor are fabricated and the air gaps 18 associated with each coil form electromagnets 19A, 19B, 19C, and 19D, respectively. A current through the windings will create a force between the stator 17 and rotor 16.

Figure 2:
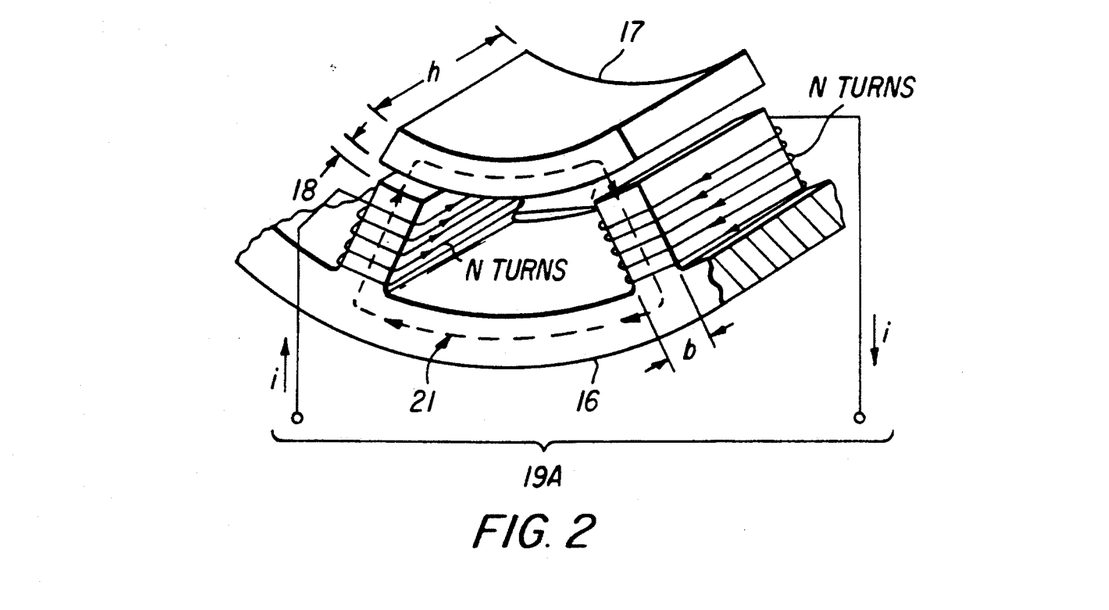
FIG. 2 is an expanded view of an electromagnet of FIG. 1B illustrating the definition of the dimensions.

Referring to FIG. 2, an enlarged perspective view of an electromagnet 19A of magnetic field bushing 15 is shown. When the two windings have current flowing therethrough, the magnetic flux generally follows a path illustrated by broken line 21. As is well known, the magnetomotive force is given by:

$$F = \oint H \cdot dl \text{ amp-turns,}$$

where H is the magnetic field intensity.

The magnetomotive force is generated by the current in the two windings of the coil. Therefore, $$\oint H \cdot dl = 2N \cdot i$$

where
N = the number of turns in each winding; and
i = the current flowing through both windings.

Because the permeability of the material used to fabricate the stator and the rotor is much higher when compared with air, for two air gaps 18 of length 1, $$2N \cdot i = 2H \cdot l$$

or $$H = N \cdot i / l \text{ amp/m.}$$

The magnetic flux density is then $$B = \mu_o H = \mu_o N \cdot i / l \text{ weber/m}^2.$$

where $\mu_o$ is the permeability of free space $= 4\pi \cdot 10^{-7}$ webers/amp·m. Furthermore, the magnetic pressure is $B^2/2\mu_o$ newtons/m$^2$, the magnetic pressure resulting in a force of attraction between the faces of the air gap equal to $$F = A \, B^2 / 2\mu_o \text{ newtons,}$$

where A is the area of the air gap face. For a rectangular face, $$F = b \cdot h \cdot B^2 / 2\mu_o \text{ newtons}$$

where
b = width shown in FIG. 2; and
h = height shown in FIG. 2.
By way of example, if N=50 turns, l=0.508·10$^{-7}$ m (0.020"); b=0.635·10$^{-3}$ m (0.250"); h=12.7·10$^{-3}$ m (0.500"); and i=1 amp; then F=0.491 newtons.

Figure 3:
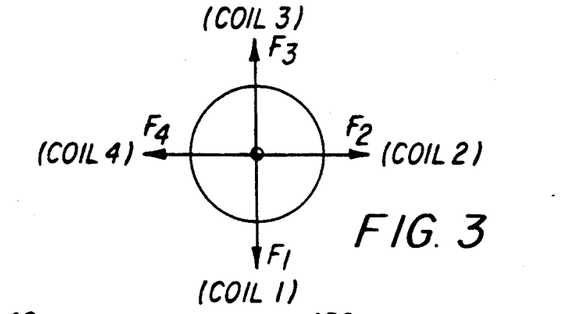
FIG. 3 is a force diagram illustrating the direction of forces resulting from the flow of current through the electromagnets.

Referring to FIG. 3, for the coil placement shown in FIG. 1A and FIG. 1B, the rotor can be suspended, if the forces acting on the rotor satisfy the following conditions:

$$F_2 = F_4$$

$$F_3 = F_1 + mg$$

where mg is the force of gravity exerted on the rotor 17. As indicated in the discussion with respect to FIG. 2, the forces are a function of the current passing through each of the coils. As a practical matter, the stator typically includes a plurality of sensors (not shown in FIG. 1 or FIG. 2). These sensors provide a signal related to the air gap distance, i.e., the distance between the stator and the rotor. This sensor signal is used to control the current through the coils by means of a feedback loop and therefore controls the force between the stator and the rotor. The resulting separation of the stator and the rotor can be maintained in this manner.

As will be clear to those skilled in the art, the magnetic field bushing described above has two degrees of freedom, the first degree of freedom being an axial rotation and the second degree of freedom being motion in the axial direction. Because no contact is present between the stator and the rotor, the coefficient of static friction between the components is absent. Similarly, no force exists in the axial direction so that a relatively modest force is necessary to move the rotor relative to the stator and the response to a force is limited only by the mass of component mechanically coupled to the rotor. These characteristics of the magnetic field bushing suggest that application to the radial motion of an actuator in a read/write head or actuator of an optical storage system would be appropriate. The actuator of an optical storage unit typically moves optical components required to interact with an optical medium, the medium typically having a disk configuration. The actuator must be rapidly brought into, and maintained, in precise alignment with a groove on the disk.

A need has therefore been felt for apparatus and associated method in which the advantages of the magnetic field bushing can be applied to the actuator of an optical storage system.

SUMMARY OF THE INVENTION

The present invention is directed to providing an actuator coupled to the remainder of an optical storage unit and suspended by magnetic field bushings to facilitate movement of the actuator in the radial direction. Briefly summarized, according to one aspect of the present invention, a stationary rod determines the travel path of a movable actuator element. The rod has sets of coils magnetically coupled to high permeability metallic strips, the metallic strips extending along the rod. The movable bushing surrounds the rod and includes high permeability regions which are associated with the strips on the rod. Activation of the coils results in a magnetic circuit which includes the strips on the rod, the regions on the movable element, and the air gaps therebetween. When the current in the coils is controlled by sensors responsive to the spacing between the bushing and the rod, the bushing can be suspended without contacting the rod at any position along the rod.

In the preferred embodiment, only two sets of coils are required, the two sets of coils providing horizontal and vertical force components. The horizontal components provide mutual horizontal magnetic force balancing and compensation for externally applied horizontal forces. The vertical force components are used to compensate for the force of gravity and to compensate for externally applied vertical forces. An embodiment is disclosed in which a linear motor is used to propel the actuator along the stationary rod. Only the windings of the linear motor are coupled to the movable actuator element.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENTS

1. Detailed Description of the Figures

Figure 4:
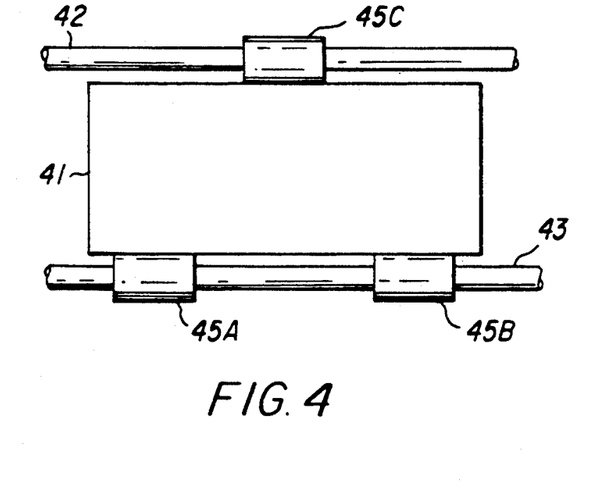
FIG. 4 illustrates a simplified moving carriage guided by two rods and suspended by three magnetic bushings.

Referring now to FIG. 4, the replacement of typical mechanical coupling elements by magnetic field bushings for an optical storage system actuator is shown. The components (not shown) needed to provide interaction with the storage medium are typically mounted on carriage 41. The motion of the carriage 41 is guided by rods 42 and 43. The magnetic field bushing 45C is coupled to one side of carriage 41, while magnetic field bushings 45A and 45B are coupled to the second side of carriage 41. The motion of carriage is constrained by rod 42 to which magnetic bushing 45C is coupled and by rod 43 to which magnetic bushing 45A and magnetic bushing 45B are coupled. The positions of the bushings are selected so that the coupling elements 45A and 45B are symmetric with respect to coupling element 45C. The use of three coupling elements is required to define a plane. In this configuration, carriage 41 will be left with only one degree of freedom. Magnetic field bushings 45A, 45B, and 45C have a configuration similar to the magnetic field bushing of FIG. 1B wherein the rod 42 and rod 43 serve as rotors. As in the embodiments previously discussed, the air gap between the magnetic field stators and the rotors (rods) must be maintained by a controlled loop electronic system activated by sensors. The arrangement illustrated in FIG. 4 for coupling the actuator carriage to the remainder of the optical storage system requires undesirable added weight and complexity for the individual bushings. For example, the coil windings for the electromagnets are located on the moving portion of magnetic field bushing (even though analogous to the stator of FIG. 1B).

Figure 5:
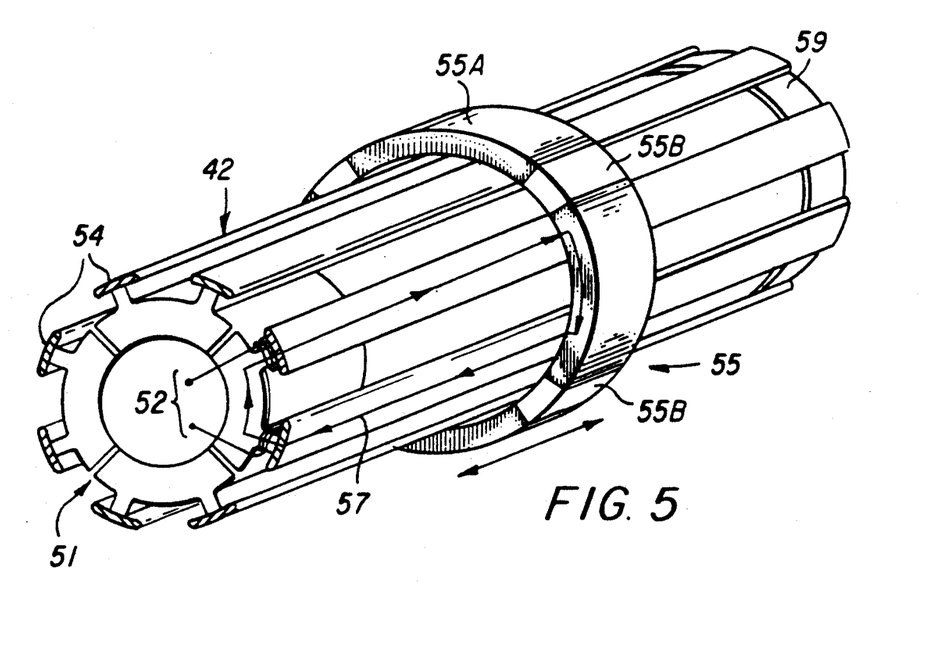
FIG. 5 illustrates a magnetic field bushing for which the coils are associated with the guide rod.

Referring next to FIG. 5, a simplified structure for a magnetic field bushing used in the configuration shown in FIG. 4, is shown. In this structure, the windings are positioned in the middle of the rod (e.g. 42). In FIG. 5, only half of the rod is illustrated. The rod has the electromagnets 51 positioned in the middle. Windings 52 are shown for only one electromagnet. Non-magnetic rings 59 are located at each end of the rod 42 (ring 59 being shown in FIG. 5 for one end only). Rings 59 and electromagnets 51 are connected by a plurality of strips 54 formed of a high permeability material such as steel. Bushing 55 which moves along the rod 42 (in response to forces not shown) includes regions of high permeability 55A and low permeability 55B. Each region of high permeability is associated with an electromagnet including two strips 54. The magnetic flux path for the magnetic field bushing of FIG. 5 is shown by dashed line 57 and includes the high permeability material associated with the electromagnet, high permeability strips 54, an associated high permeability region of bushing 55 and the air gaps between the associated high permeability region of bushing 55 and the associated strips 54.

Figure 6:
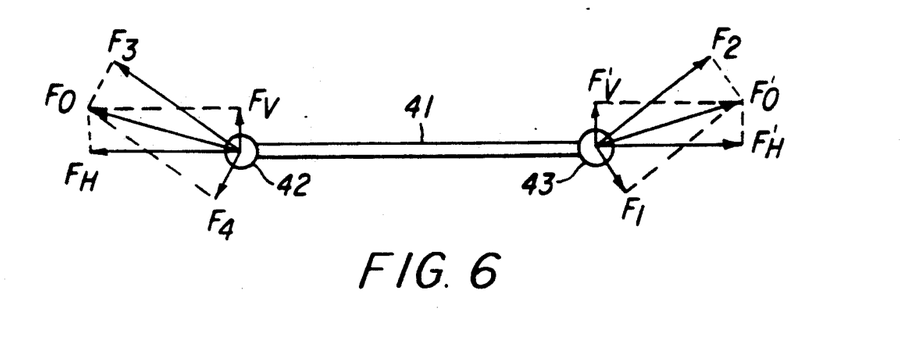
FIG. 6 is a force diagram for two magnetic bushings with two coils in each bushing.

Referring next to FIG. 6, force diagram illustrating the operation of a simplified configuration shown in FIG. 4 and in FIG. 5 is demonstrated. In particular, the number of electromagnets required to suspend the bushings connected to the carriage can be reduced. For each bearing, only two electromagnets are required. As indicated by the force diagram, the $F_1$, $F_2$, $F_3$, and $F_4$ are the forces resulting from the simplified configuration of the electromagnets. The electromagnets are subject to the conditions that $$F_1 < F_2$$

$$F_4 < F_3$$

Figure 7:
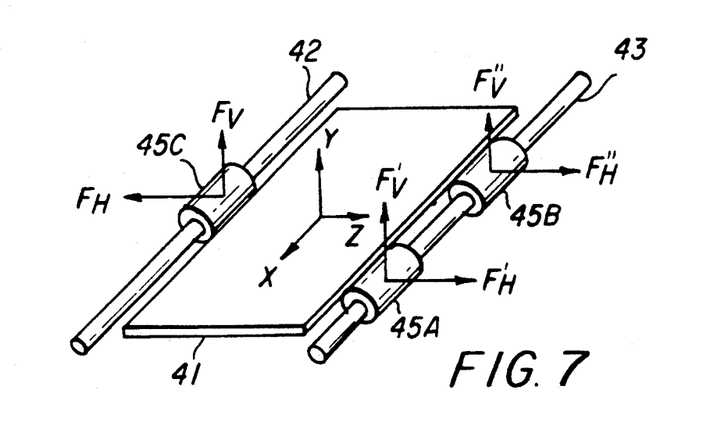
FIG. 7 illustrates the forces similar to those of FIG. 6 and differing only in the presence of two magnetic field bushings coupled to one guide rod.

Each pair of forces, $F_1,F_2$ and $F_3,F_4$, can be combined to form resultant forces $F_0$ and $F_0'$. The force $F_0$ can be determined to have a horizontal component, $F_H$, and a vertical component, $F_V$. Similarly, the force $F_0'$ can be similarly resolved into a horizontal component, $F_H'$, and a vertical component, $F_V'$. However, the present configuration includes two magnetic field bearings on one side of the carriage as compared with one magnetic field bushing on the other side of the carriage as shown in FIG. 7. For proper carriage suspension, the equations become:

$$F_H = F_H' + F_H'', \text{ and}$$

$$mg = F_V + F_V' + F_V''.$$

As will be clear to those skilled in the art, the configuration shown in FIG. 6 and FIG. 7 is analogous to the dividing of the magnetic field bushing into two parts and then physically separating the two portions.

Figure 8:
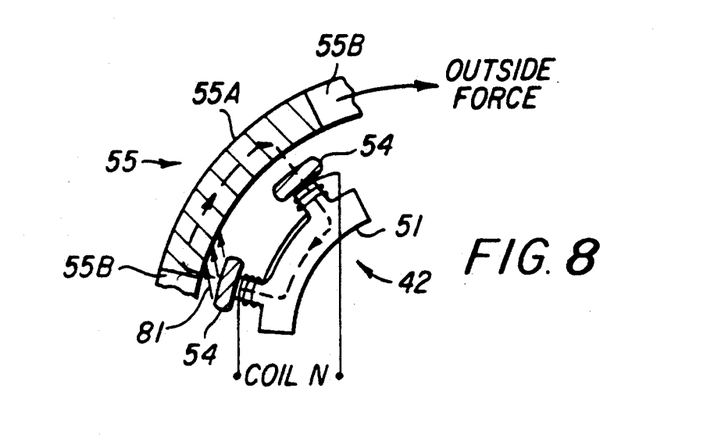
FIG. 8 is a cross-sectional view of an electromagnet illustrating magnetic flux lines in the steel structure.

Referring next to FIG. 8, a partial cross-sectional view of the rod 42 and bushings 55 is shown in the presence of an external force causing a relative rotation of the bushing 55. When the bushing 55 is rotated relative to the rod 42 and particularly the strips 54, the flux lines in gap 81 become slanted. The slanted flux lines provide a restoring force attempting to realign the bushing portion 55A over the strip 54. This restoring force will result in keeping bushing 55 in its balanced position.

Figure 9:
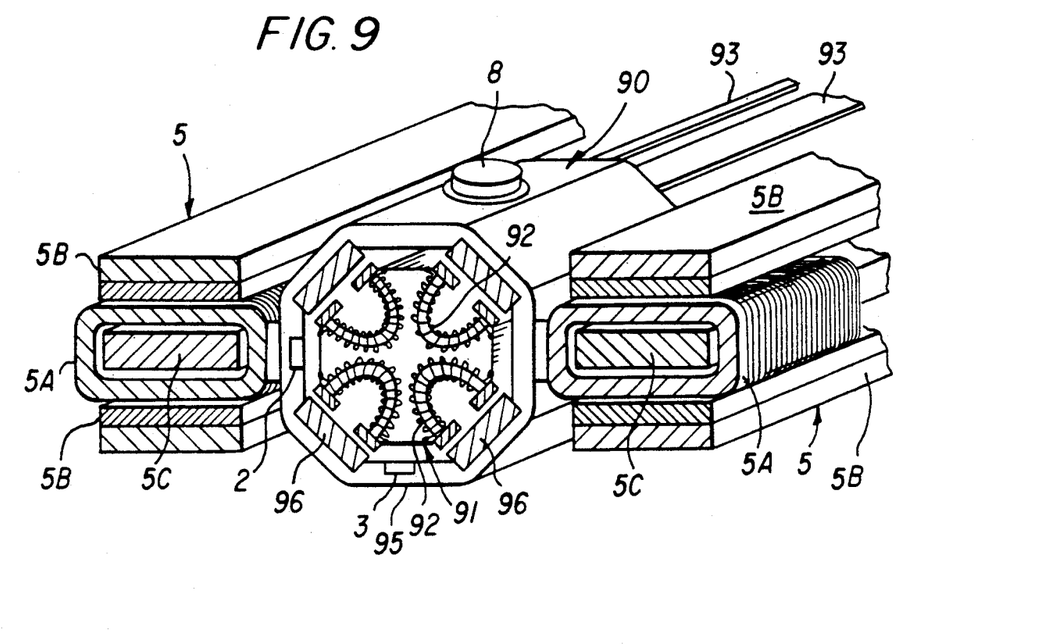
FIG. 9 is a perspective view of a simplified embodiment of a magnetic bushing for an optical storage unit actuator.

Referring to FIG. 9, a magnetic field bushing 90 is illustrated which is lighter than the previously described embodiments and to which the (linear) motors 5 used in the relative motion of the components can be conveniently coupled. An multi-sided movable member 95 has a plurality of high permeability strips 96 coupled thereto to provide the magnetic flux path. The movable member 95 can have components carried by the carriage, such as lens 8 connected thereto. The stationary member 91 includes a plurality of electromagnets 92, as well as high magnetic permeability strips 93 for providing a path for completing the magnetic flux path via the movable member 95. Sensors 2 and 3 provide a signal which is a function of the horizontal and vertical air gap separation. The electromagnets 92 are mounted at an angle, the requirement being that the forces resulting from the application of current through the electromagnets provide a resulting force maintaining the air gap within predetermined limits. The force which moves the movable element 95 is provided by linear motors 5. Only the coils 5A are coupled to the movable element 91, the remainder of the linear motor elements 5B being stationary relative to the optical storage unit.

Figure 10:
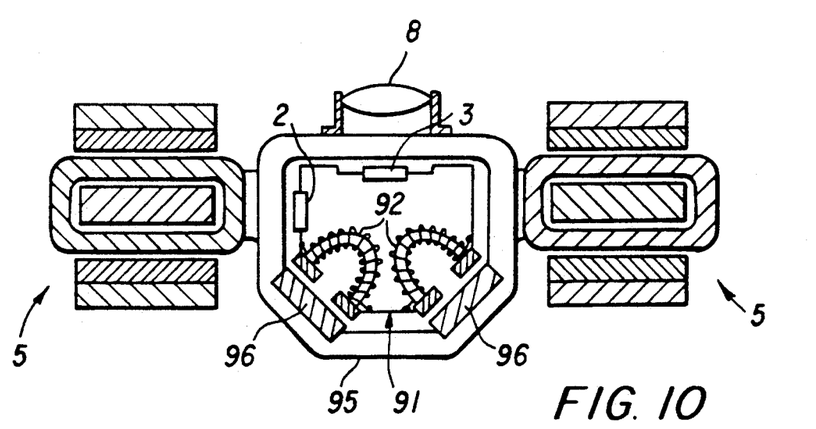
FIG. 10 is a cross-sectional view of the magnetic bushing shown in FIG. 9 with a further reduction in the complexity with only two electromagnets being used for the carriage suspension.

Referring to FIG. 10, a cross section of a magnetic field bushing for carrying read/write elements of an optical storage unit similar to the magnetic field bushing of FIG. 9 is illustrated. In the embodiment shown in FIG. 10, however, only two electromagnets 92 are required for providing the forces to suspend the carriage. The reduction in the number of electromagnets results in a reduction in mass of the movable member 95 and in the complexity of the stationary member 91.

Figure 11A:
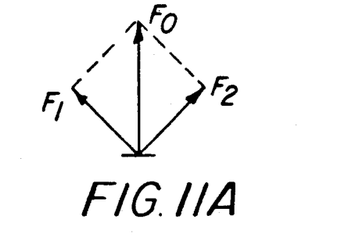
FIGS. 11A, 11B, 11C, and 11D illustrate the compensation for external forces by the electromagnet configuration of FIG. 10.
Figure 11B:
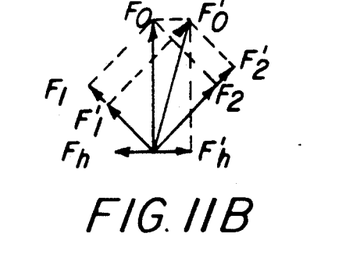
Figure 11C:
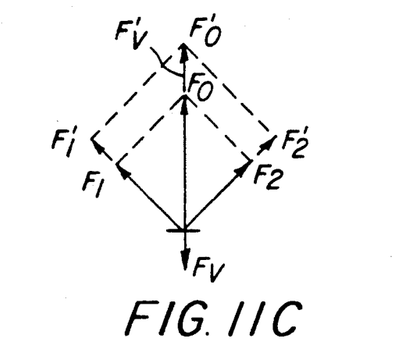
Figure 11D:
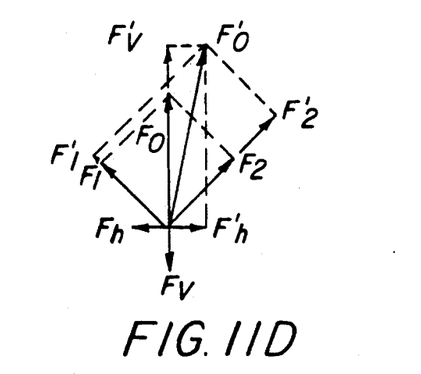

Referring to FIG. 11A through FIG. 11D, the capability of the two electromagnets of the magnetic bearing of FIG. 10 to compensate for any external force having an arbitrary direction is shown. In FIG. 11A, the forces generated by the electromagnets, $F_1$ and $F_2$, result in a force $F_0$ which has to balance the gravitational force on the movable structure. In FIG. 11B, the adjustment of force $F_1$ to force $F'_1$, the adjustment of force $F_2$ to force $F'_2$ to compensate for an external force $F_H$ while still retaining vertical force $F_0$ is shown. FIG. 11C shows a similar adjustment of forces for the application of an arbitrary external vertical force $F_V$. And FIG. 11D illustrates that any externally applied force having a vertical component $F_V$ and a horizontal component $F_H$ can be compensated for by adjusting forces $F_1$ and $F_2$.

Figure 12:
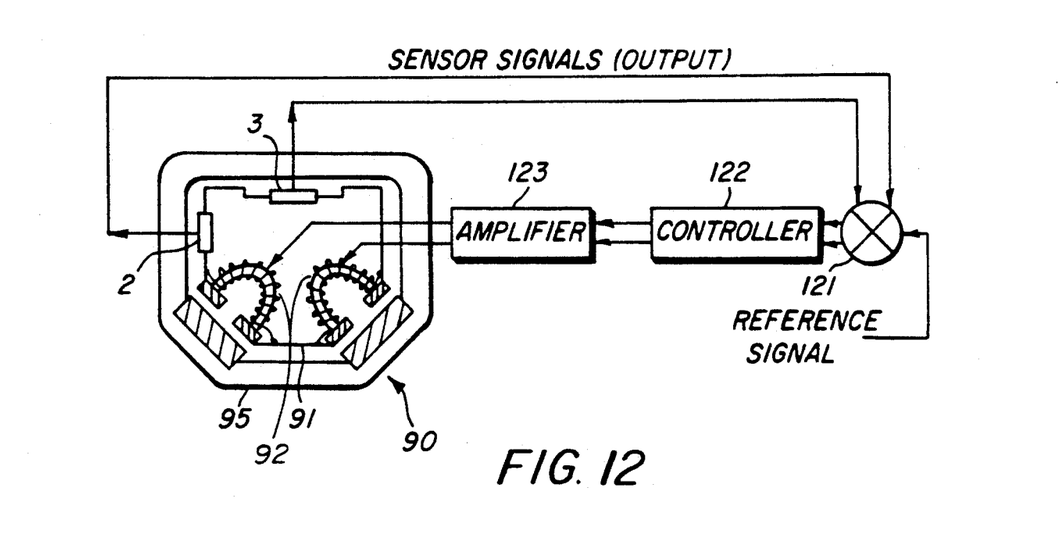
FIG. 12 is a block diagram of the apparatus needed to maintain the air gaps of the electromagnets within predetermined limits.

Referring to FIG. 12, the control circuitry required to maintain the spacing between the stationary element 91 and the movable element 95 of the magnetic field bushing 90 is shown. Sensor 2 provides a sensor signal determined by the horizontal distance between the movable element 95 and the stationary element 91 while sensor 3 provides a sensor signal determined by the horizontal spacing between the movable element 95 and the horizontal element 91. The two sensor signals are combined and compared with a reference signal in combining unit 121. Based on the output signal from combining unit 121, the controller unit determines the current which should be flowing through the coils of each electromagnet 92. The output signal from the controller unit 122 is amplified in amplifier unit 123 and the output signal from amplifier unit 123 is used to control individually the current in each electromagnet, thereby controlling the spacing between the movable element and the stationary element.

2. Operation of the Preferred Embodiment

It will be now appreciated that there has been presented apparatus and an associated method for providing a relatively simple actuator using magnetic field bushings. The use of the magnetic field bushings for coupling an actuator of an optical storage system with the remainder of the optical storage system has the advantage of essentially frictionless travel. The apparatus includes a stationary rod having electromagnet coils and strips of a high permeability magnetic material for providing an enclosed magnetic flux path to the movable actuator element. The actuator includes regions of high permeability material associated with each set of electromagnet coils. These actuator regions, along with the associated air gaps complete the path for the magnetic flux and result in a force being applied between the stationary rod and the actuator. When the appropriate current flows, the electromagnet coils and the high permeability strips of the rod and the high permeability regions of the actuator are positioned as described herein, only two sets of electromagnets are required to provide an operable magnetic field bushing configuration. By providing sensors to determine a spacing between the rod and the actuator, the magnetic field bushing configuration can respond automatically to external forces and still achieve an equilibrium configuration, i.e., a configuration without contact between the rod and the actuator. The use of only two sets of coils for the generation of the magnetic field further reduces the complexity of the control circuit because only two currents are controlled.

A further feature of the actuator of the present invention is that a linear motor can be provided for controlling the relative motion between the rod and the actuator. Only the coils of the linear motor need be supported along with the actuator by the magnetic field configuration. Because of the essentially frictionless operation of the magnetic bushing, the actuator can be precisely and rapidly positioned.

Operation of the present invention is believed to be apparent from the foregoing description and drawings, but a few words will be added for emphasis.

The preferred embodiment provides a magnetic field bushing with reduced complexity both in the implementing apparatus which provides the force-producing magnetic field and in the control circuitry which controls the current through the coil. When the magnetic bushing of the present invention is combined with a linear motor as described herein, an improved actuator of the type used in accessing optical storage media in an optical storage system is provided.

While the invention has been described with reference to an actuator for an optical storage system, it is apparent that the invention is easily adapted to other devices that have components for which relative motion with minimum friction is desired. While the invention has been described with particular reference to a preferred embodiment, it will be understood by those skilled in the art that various changes may be made and equivalents may be substituted for elements of the preferred embodiment without departing from the spirit and scope of the invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An actuator unit for providing a linear movement relative to an optical storage medium, said actuator unit comprising:
    a rod, said rod including at least two sets of coils, said rod further including at least one strip of high permeability material associated with each coil along a surface of said rod; and
    a member substantially surrounding said rod and capable of moving along said rod, said member having regions of high permeability on an interior surface of said member, each member region proximate at least two rod strips, each member region completing a magnetic circuit for magnetic flux generated by said coil associated with said strips proximate said member region, wherein said rod strips and said member regions are positioned to maintain a predetermined air gap therebetween when said coils are activated by preselected currents.

2. The actuator unit of claim 1 wherein said number of sets of coils is two.

3. The actuator unit of claim 1 further comprising:
    a plurality of sensors, each sensor providing a signal determined by a spacing between said rod surface and said member interior surface; and
    control means responsive to said sensor signals for providing said preselected currents to said coils.

4. The actuator unit of claim 1 further comprising at least one winding coupled to said member, said winding being part of a linear motor for moving said member along said rod.

5. The actuator unit of claim 1 wherein said rod extends ina generally radial direction over apparatus for rotating an optical storage disk, said member further having coupled thereto optical elements for accessing data stored on said optical storage disk.

6. A magnetic field bushing comprising:
    a stator, said stator having at least two sets of strips of high permeability magnetic material on a surface of said stator, said stator having at least two sections of high permeability magnetic material, each section of magnetic material magnetically coupling one set of strips, each section having a winding of conducting material for generating magnetic flux in said section; and
    a rotor, said rotor having an interior surface with at least two regions of high permeability magnetic material, each of said regions proximate an associated set of strips and having an air gap with a predetermined spacing therebetween when currents with preselected magntiudes are applied to each winding, said regions completing a magnetic circuit which includes a sector along said set of strips magnetically coupled to said region proximate said set of magnetically coupled strips.

7. The magnetic field bushing of claim 6 wherein said stator has a rod-like configuration with said strips extending along a length of said stator, said rotor capable of moving along a length of said stator.

8. The magnetic field bushing of claim 6 further comprising a carriage, wherein said stator includes a first and a second portion, each portion being parallel rod-like structures, each portion having at least a section along with a set of magnetically coupled strips and a coil of conducting material, said rotor being divided into at least two members, each member coupled to opposite sides of said carriage, each member including at least one high permeability region, said stator portions positioned to engage said rotor members permitting said carriage to travel parallel to said stator portions.

9. The magnetic field bushing of claim 6 further comprising:
    a plurality of sensors, each sensor providing a signal determined by a spacing between said rotor and said stator; and
    control apparatus responsive to said sensor signals for controlling currents through said coils, said currents maintaining said air gaps with said predetermined spacing.

10. The magnetic field bushing of claim 6 wherein a first air gap is positioned to result in a force having a horizontal component and a vertical component, a second air gap positioned to provide a horizontal component in an opposite direction and a vertical component.

11. The magnetic field bushing of claim 6 further comprising:
a least one conductor winding coupled to said rotor, said conductor winding providing a controllable field for use with a linear motor.

12. The magnetic field bushing of claim 6 wherein said rotor substantially surrounds said stator.

13. A unit having members capable of relative motion without physical contact, said unit comprising:
a first member having a generally rod-like configuration, said first member having at least two sections fabricated from a high permeability magnetic material, said first member having a set of at least two strips of high permeability magnetic material magnetically coupled to each section and extending along a length of said first member, each section of said first member having a conducting coil coupled thereto; and
a second member, said second member having at least two regions of high permeability magnetic material on a surface thereof, each of said regions being proximate to and separated from an associated set of strips by a predetermined air gap when said first member is in an operable relationship relative to said second member, said section along with said magnetically coupled strips and said proximate region forming a magnetic circuit, wherein currents in said coils provide a force across said air gaps for maintaining said equilibrium position.

14. The unit of claim 13 further comprising:
a plurality of sensors for providing a signal determined by a spacing between said first and said second members, and
control means responsive to said sensor signals for controlling a current through said coils, said current through said coils maintaining said first and said second members in said operable relationship.

15. The unit of claim 13 further comprising at least one winding coupled to said second member, said one winding forming part of a linear motor when said operable relationship exists between said first and said second members.

16. The unit of claim 14 wherein a force generated by a first air gap has a horizontal component and a vertical component, a force generated by a second air gap generating a force in an opposite horizontal direction and a vertical component, wherein forces generated by said first and said second air gap maintain said operable relationship between said first and said second member when external forces are applied thereto.

* * * * *

UNITED STATES PATENT AND TRADEMARK OFFICE
CERTIFICATE OF CORRECTION

PATENT NO. : 5,220,222
DATED : June 15, 1993
INVENTOR(S) : Boris A. Shtipelman

It is certified that error appears in the above-identified patent and that said Letters Patent is hereby corrected as shown below:

Title Page, Line 22            delete "the members"
   in Abstract Signed and Sealed this Third Day of May, 1994

Attest:

BRUCE LEHMAN

Attesting Officer         Commissioner of Patents and Trademarks